United States Patent [19]
Waggoner et al.

[11] Patent Number: 5,397,502
[45] Date of Patent: Mar. 14, 1995

[54] HEAT RESISTANT LIQUID CRSYTALLINE POLYMERS

[75] Inventors: Marion G. Waggoner, Hockessin; Michael R. Samuels, Wilmington; David F. Adcock, Hockessin, all of Del.

[73] Assignee: E. I. Du Pont de Nemours and Company, Wilmington, Del.

[21] Appl. No.: 72,976

[22] Filed: Jun. 10, 1993

[51] Int. Cl.⁶ .................... C09K 19/52; C09K 19/00; C08K 5/04; C08G 63/00
[52] U.S. Cl. .................. 252/299.01; 428/1; 524/396; 528/193
[58] Field of Search .................. 252/299.01; 408/1; 528/193, 176, 190, 194; 524/396

[56] References Cited

U.S. PATENT DOCUMENTS

| | | | |
|---|---|---|---|
| 4,161,470 | 7/1979 | Calundann | 260/40 |
| 4,574,066 | 3/1986 | Gibbon et al. | 264/85 |
| 4,742,149 | 5/1988 | Finestone | 528/179 |
| 4,943,606 | 7/1990 | Inoue et al. | 523/457 |
| 4,983,688 | 1/1991 | Jennings et al. | 525/389 |
| 5,098,940 | 3/1992 | Brooks | 524/227 |
| 5,250,654 | 10/1993 | Alms et al. | 528/193 |
| 5,264,477 | 11/1993 | Wissbrun et al. | 524/396 |

Primary Examiner—Shean Wu

[57] ABSTRACT

The heat resistance of polyester liquid crystalline polymers containing repeat units in selected ratios derived from hydroquinone, 4,4'-biphenol, terephthalic acid, 4-hydroxybenzoic acid, and one or both of 4,4'-bibenzoic acid and 2,6-naphthalene dicarboxylic acid is improved by the addition thereto of 15 to 3000 ppm of an alkali metal or 50 to 3000 ppm magnesium or calcium.

10 Claims, No Drawings

HEAT RESISTANT LIQUID CRSYTALLINE POLYMERS

BACKGROUND

This invention relates to certain liquid crystalline polymers (LCPs) containing alkali metal, magnesium, or calcium. The LCPs have a use temperature, as judged by heat deflection temperature, that is increased in comparison to the same LCPs lacking the alkali metal, magnesium, or calcium. It is well known that LCPs are useful in some of their applications because they can be used at high temperatures, such as 260° C. It has been discovered that when certain LCPs contain alkali metal, magnesium, or calcium, their melting points and their heats of melting are increased, while their use temperature, as judged by the heat deflection temperature (HDT) when they are filled with glass fiber, is also increased. LCPs that have higher use temperatures are particularly useful in moldings, such as electrical connectors, mechanical parts, etc., where higher use temperatures than would be provided by an LCP not containing the alkali metal, calcium, or magnesium are desired.

SUMMARY OF THE INVENTION

This invention relates to a composition comprising
(a) about 15 to about 3,000 parts per million of an alkali metal or about 50 to about 3000 parts per million of magnesium or calcium and
(b) a liquid crystalline polymer consisting essentially of repeat units of the formulae

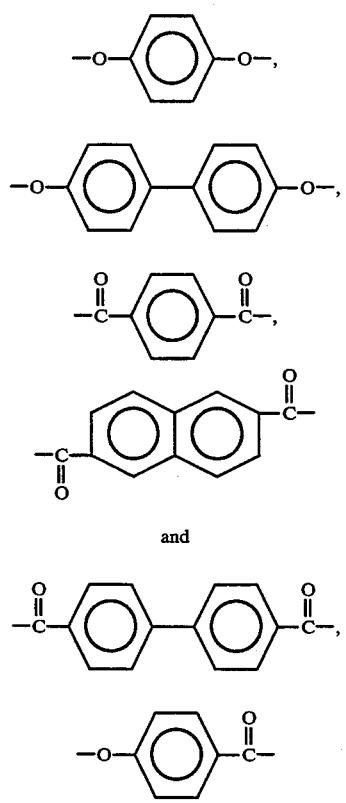

wherein
the molar ratio of (I):(II) is from 65:35 to 40:60,
the molar ratio of (III):(IVa plus IVb) is from 85:15 to 50:50,
the molar ratio of the total of (I) and (II) to the total of (III) and (IV) is substantially 1:1, and
there are 100 to 600 moles of (V) per 100 moles of (I) plus (II).

DETAILED DESCRIPTION OF THE INVENTION

The present invention relates to compositions comprised of certain LCPs containing alkali metal, magnesium, or calcium. In these compositions, in comparison to the same compositions without the alkali metal, magnesium, or calcium, the melting point of the LCP is increased, usually by about 5° to 10° C. and the heat deflection temperature of a 30% glass fiber filled LCP composition is increased, typically by about 10° to 30° C. As a result, the LCP compositions described herein have a higher use temperature, as determined by heat deflection temperature, than do the same LCP compositions without the alkali metal, magnesium, or calcium.

Alkali metals are preferred over calcium and magnesium. Alkali metals, as used herein, are selected from the group consisting of lithium, sodium, potassium, cesium, and rubidium metals. Preferred alkali metals are selected from lithium, sodium, and potassium metals. Potassium metal is the especially preferred alkali metal.

The alkali metals, calcium, and magnesium are added to, and present in, the LCP in the form of salt(s). The metal itself is in the form of its cation.

Most of the LCPs described herein have been previously disclosed in U.S. Pat. No. 5,110,896 and U.S. patent application No. 07/878,150 filed May 4, 1992, now U.S. Pat. No. 5,250,654, both of which are hereby included by reference. In the instant LCPs, repeat unit (I) is derived from hydroquinone, (II) is derived from 4,4'-biphenol, (III) is derived from terephthalic acid, (IVa) is derived from 2,6-naphthalene dicarboxylic acid, (IVb) is derived from 4,4'-bibenzoic acid, and (V) is derived from 4-hydroxybenzoic acid. Herein, when the number of moles of (IV) is given, it is the total number of moles of (IVa) and (IVb).

Any molar ratio of (IVa) to (IVb) may be used, but in preferred compositions, the ratio of moles of (IVb) to (IVa) [(IVb)/(IVa)] is 0 to about 2. In preferred compositions, the molar ratio of (I):(II) is from 60:40 to 40:60 and the molar ratio of (III):(IV) is from 85:15 to 60:40. When (IVb) is not present, it is preferred that there are 200 to 600 moles of (V) per 100 moles of (I) plus (II), more preferably about 200 to 450. When (IVb) is present, it is preferred that there are 100 to 400 moles of (V) per 100 moles of (I) plus (II), more preferably about 200 to 350.

The LCPs may be made by any method known in the art, but it is preferred if they are made by converting all starting material hydroxyl groups to ester groups, particularly acetates, and then condensing the esters with the carboxyl groups in the starting materials to form the polymer. It is especially preferred if all the starting materials are combined, reacted with a carboxylic anhydride (especially acetic anhydride) to esterify the hydroxyl groups present, and then condensed to form the LCP.

The alkali metal, magnesium, or calcium (all in the form of salts) may be added to the LCP by any method that results in a reasonably uniform mixture; that is, the metal cations (salt) should be very well dispersed in the LCP. In one preferred method, the molten LCP may be mixed with the salt by using a mixer such as a twin screw extruder. If the salt is added to the already formed LCP, it is preferred if at least about 20%, preferably at least 50% or more, of the polymer end groups are carboxyl. The salt can also be added to the polymerization ingredients before or during the polymerization, especially before the polymerization is started (see Examples 1–11). If added before or during the polymerization, it is preferred that the polymerization be done by condensing the ester of the hydroxyl groups in the monomers with the carboxyl groups in the monomers. In another method, the alkali metal, magnesium, or calcium (salts) may be present as "impurities" in one or more of the starting materials. In this case, the final LCP must still contain the minimum amount of alkali metal, magnesium, or calcium required.

In addition to the alkali metal, magnesium, and calcium (salts) present in the LCP, the compositions herein may also contain other materials, including but not limited to, fillers (such as talc, clay, glass fiber, carbon fiber, and aramid fiber), colorants, antioxidants, etc. Especially preferred fillers are fibers, such as glass fiber, carbon fiber, and aramid fiber. Glass fiber is most preferred. Also included in these materials (as for fillers) are alkali metal, magnesium and calcium salts, as in U.S. Pat. No. 4,943,606. The total amount of alkali metal, calcium or magnesium present in the LCP may exceed 3,000 ppm, but it is believed that above 3,000 ppm the effect on the melting point and HDT is negligible in comparison with the effect at about 3,000 ppm. Therefore amounts of alkali metal, magnesium, and calcium above 3,000 ppm are considered herein "fillers".

If a filler is added that contains an alkali metal, magnesium, or calcium, such metal (cations) are not included in the total of the metal ions in the polymer unless such metal ions leach from or react with the polymer. For instance, sodium may be present in glass fibers. If such sodium cannot leach from the fibers, it is not included in the metal cations used herein. However, if enough sodium leaches into the polymer to reach minimum level prescribed herein, it is included within the present invention.

As stated above, the alkali metal, magnesium, and calcium are added to the LCP in the form of salts. The anion in the salt which is originally added to the LCP is not critical. Useful salts include, but are not limited to, bisulfates, sulfates, carbonates, bicarbonates, hydroxides, halides, and carboxylates. Preferred salts are bisulfates, sulfates, carbonates, bicarbonates and carboxylates. Preferred carboxylates are salts of aliphatic carboxylic acids containing 2 to 6 carbon atoms, and a carboxylate salt of any of the carboxylic acids from which the polymeric repeat units are derived. Especially preferred carboxylates are acetate and 4-hydroxybenzoate.

In preferred compositions, about 100 parts per million (ppm) by weight to about 2000 ppm of the alkali metal, magnesium or calcium are present in the LCP composition. The amount of metal present in the composition can be measured by a variety of analytical techniques. Analyses used in the Examples herein were performed by Inductively Coupled Plasma Atomic Absorption, as described below.

EXAMPLES

In the following Examples, melting points were measured using ASTM D3418-82, modified by using a heating rate of 25° C./min. Melting points were measured on the LCPs without glass fiber. The melting points reported are from the first heat. HDT was measured by ASTM D648, using a force of 1.82 MPa, on LCP containing 30% by weight glass fiber. Metals content was determined by Inductively Coupled Plasma Atomic Absorption. This analysis was done by weighing about 10 g of the LCP sample into a large platinum dish and slowly ashing in a muffle furnace at 550° C. After cooling to room temperature, the residue was wet with water. Then, 2 ml of concentrated HCl and 15–20 drops of concentrated $H_2SO_4$ were added. The dish was warmed on a hot plate until a clear solution was obtained. The solution was cooled and then diluted to 25 ml in a volumetric flask. The sample was then analyzed by Inductively Coupled Plasma Atomic Absorption at the appropriate wavelengths for the elements of interest.

Comparative Examples A & B and Examples 1–15

In Comparative Examples A & B and Examples 1–15, two LCPs were used. Composition A was 50/50/70/30/320 (molar parts) of hydroquinone/4,4'-biphenol/terephthalic acid/2,6-naphthalene dicarboxylic acid/4-hydroxybenzoic acid, respectively. Composition B was 50/50/85/15/320 (molar parts) of hydroquinone/4,4'-biphenol/terephthalic acid/2,6-naphthalene dicarboxylic acid/4-hydroxybenzoic acid, respectively.

Table 1 below lists the salts added to each of compositions at the beginning of the polymerizations, as well as the melting point of the as made polymer, and the HDT of the 30% glass filled LCPs. Table 2 lists the metal content of 3 examples as measured by Inductively Coupled Plasma Atomic Absorption. The metals content of Comparative Example B was also measured. The polymer of Comparative Example B contained less than 10 ppm of any alkali metal, 25 ppm of calcium, and 8 ppm of magnesium.

Compositions A and B were prepared as set forth below. X1–X8 values are reported in Table 1, below. The reactants were charged, in a nitrogen atmosphere, into a reaction vessel equipped with a Vigreaux Column, condenser, and a stirrer (stir speed set at X1 RPM). The resultant reaction mixture was heated to reflux. Reflux began at a pot temperature of approximately 150° C. The reaction mixture was refluxed X2 minutes, at constant temperature. During the next X3 minutes, the pot temperature was slowly raised to X4° C., during which time acetic acid byproduct was removed. Pressure was then reduced over the next X5 minutes to about 133 Pa (abs), while stirrer speed was reduced to X6 RPM and the pot temperature was increased to about X7° C. The polymerization was terminated approximately X8 hours after charging of the ingredients. Polymer was removed from the reaction vessel with a scooping tool and rapidly cooled to room temperature.

Unless otherwise stated, the LCP composition of Examples 1–15 were prepared as described above. The salts added to Examples 1–15 are provided in Table 1, below.

TABLE 1

| Ex. | Composition | Added[a] Salt | ppm[b] Metal in LCP | X1 | X2 | X3 | X4 | X5 | X6 | X7 | X8 | Melting Point °C. | HDT °C. |
|---|---|---|---|---|---|---|---|---|---|---|---|---|---|
| A | A | None | — | 50 | 60 | 210 | 350 | 90 | 30 | 370 | 6.8 | 332.7 | 238 |
| B | B | None | — | 50 | 60 | 210 | 350 | 90 | 30 | 370 | 6.2 | 352.7 | 270 |
| 1 | A | K$_2$SO$_4$ | 650 | 50 | 60 | 210 | 350 | 90 | 30 | 370 | 6.4 | 342.6 | 269 |
| 2 | A | KOH | 326 | 50 | 60 | 210 | 350 | 90 | 30 | 370 | 6.5 | 339.0 | 264 |
| 3 | A | K$_2$CO$_3$ | 326 | 50 | 60 | 225 | 350 | 90 | 30 | 370 | 6.6 | 344.5 | 273 |
| 4 | A | Na$_2$CO$_3$ | 326 | 50 | 60 | 210 | 350 | 90 | 30 | 370 | 6.6 | 340.0 | 260 |
| 5 | A | MgCO$_3$ | 323 | 50 | 60 | 210 | 350 | 90 | 30 | 370 | 6.5 | 340.0 | 259 |
| 6 | A | CaCO$_3$ | 326 | 50 | 60 | 205 | 350 | 90 | 30 | 370 | 6.6 | 337.2 | 256 |
| 7 | A | Li$_2$CO$_3$ | 282 | 50 | 60 | 215 | 350 | 90 | 30 | 370 | 6.4 | 344.7 | 262 |
| 8 | A | KI | 325 | 50 | 60 | 220 | 355 | 90 | 30 | 370 | 6.6 | 339.0 | 265 |
| 9 | A | KOAc | 234 | 125 | 60 | 60 | 360 | 120 | 20 | 370 | 6.0 | 340.3 | 269 |
| 10 | A | KHBA | 32 | 125 | 40 | 120 | 350 | 120 | 20 | 370 | 5.0 | 342.2 | 269 |
| 11 | A | KHBA | 26 | 125 | 40 | 120 | 370 | 105 | 20 | 370 | 5.0 | 342.3 | 267 |
| 12 | A | [c] | ~1300 | 125 | 60 | 70 | 320 | 115 | 20 | 370 | 4.75 | 348.3 | 270[d] |
| 13 | A | [c] | ~1300 | 125 | 60 | 60 | 320 | 180 | 20 | 365 | 5.5 | 344.1 | 270[d] |
| 14 | A | [c] | ~1300 | 125 | 60 | 85 | 320 | 190 | 20 | 365 | 5.5 | 343.1 | 270[d] |
| 15 | B | [c] | ~1300 | 125 | 60 | 70 | 320 | 105 | 20 | 380 | 5.5 | 360.5 | 292 |

[a] OAc is acetate, HBA is 4-hydroxybenzoate
[b] Calculated amount
[c] 4-hydroxybenzoic acid having ~2000 ppm K used in polymerization
[d] polymers of Examples 12, 13, and 14 mixed together before compounding with glass fiber

TABLE 2

| Example | Metal | Metal Content, ppm |
|---|---|---|
| 3 | K | 290 |
| 5 | Mg | 275 |
| 7 | Li | 305 |

Compounding of the LCPs and Molding Test Bars

Unless otherwise specified, compounding of LCP compositions in the Examples above with any other component, including glass, was performed in a 28 mm Werner and Pfleiderer twin screw extruder having zones with conventional conveying elements, kneading or mixing elements, and a low pressure zone with venting under vacuum of any volatiles from the polymer melt, a second zone of conveying elements, and a die. As the compounded LCP compositions exited the die, they were quenched with a water spray and cut into pellets with a conventional strand cutter. The extruder barrel and die temperatures were maintained at about 290°–330° C. and 300°–320° C., respectively. Prior to molding, the pellets were dried overnight for about 16 hours in a vacuum oven with nitrogen purge at 100°–130° C. The dried polymer pellets were molded into standard test bars as required per ASTM D638 for determining tensile properties, on either an Arburg molding machine equipped with a 42 gram capacity barrel or an HPM molding machine equipped with a 168 gram capacity barrel, with barrel temperature of 330°–360° C. and injection pressures of 27.6–41.3 MPa.

We claim:

1. A composition comprising
   (a) about 15 to about 3,000 parts per million of an alkali metal or about 50 to about 3000 parts per million of magnesium or calcium, and
   (b) a liquid crystalline polymer consisting essentially of repeat units of the formulae

  (I)

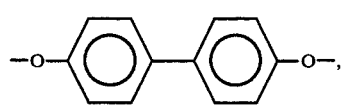  (II)

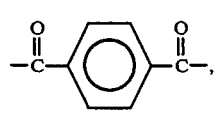  (III)

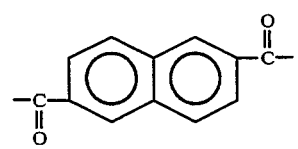  (IVa)

and

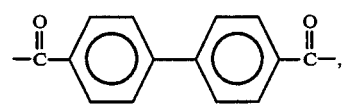  (IVb)

and

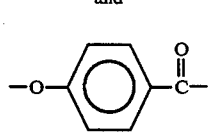  (V)

wherein
the molar ratio of (I):(II) is from 65:35 to 40:60,
the molar ratio of (III):(IVa+IVb) is from 85:15 to 50:50,
the molar ratio of the total of (I) and (II) to the total of (III) and (IV) is substantially 1:1, and
there are 100 to 600 moles of (V) per 100 moles of (I) plus (II).

2. The composition of claim 1 wherein repeat unit (IVb) is not present.

3. The composition of claim 2 wherein the molar ratio of (I):(II) is from 60:40 to 40:60, the molar ratio of (III) to (IVa) is from 85:15 to 60:40, and there are 200 to 450 moles of (V) to 100 moles of (I) plus (II).

4. The composition of claim 1 wherein the molar ratio of (IVb) to (IVa) is 0 to about 2.

5. The composition of claim 1 wherein about 100 ppm to about 2000 ppm of said alkali metal, magnesium, or calcium is present.

6. The composition of claim 1 wherein said alkali metal, magnesium, or calcium is added in the form of a salt selected from sulfate, bisulfate, carbonate, bicarbonate, hydroxide, halide, and carboxylate salts.

7. The composition of claim 1 wherein said alkali metal, magnesium, or calcium is added before or during polymerization of said liquid crystalline polymer.

8. The composition of claim 7 wherein an alkali metal is added before or during polymerization of the liquid crystalline polymer.

9. The composition of claim 1 wherein (a) is an alkali metal.

10. The composition of claim 9 wherein the alkali metal is selected from the group consisting of lithium, sodium and potassium metals.

* * * * *